July 27, 1943.
F. R. BALCAR
2,325,577
RECOVERY OF OLEFIN OXIDES
Filed June 6, 1941
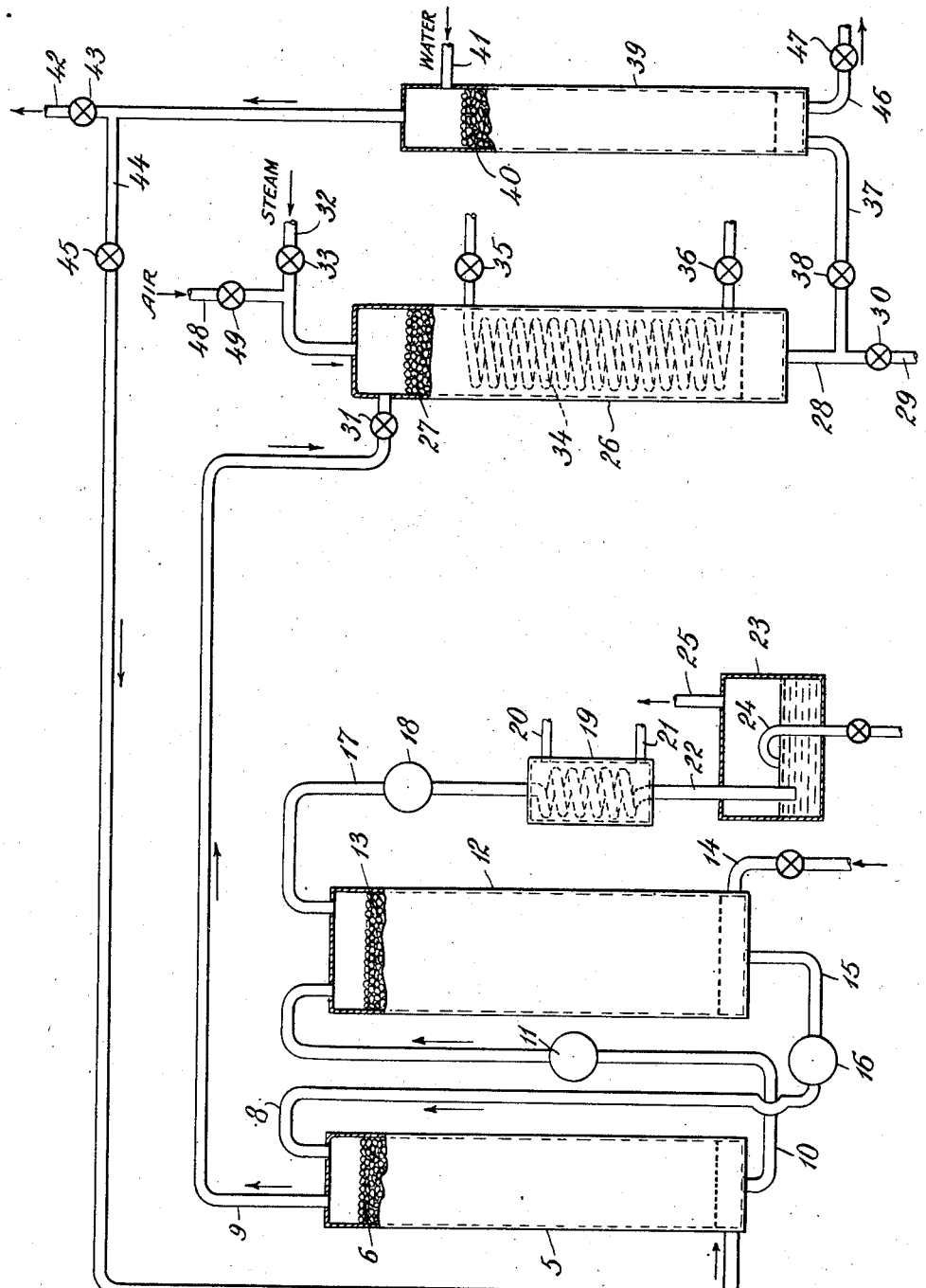
INVENTOR
Frederick R. Balcar
BY
ATTORNEYS Patented July 27, 1943

2,325,577

UNITED STATES PATENT OFFICE 2,325,577

RECOVERY OF OLEFIN OXIDES

Frederick R. Balcar, Stamford, Conn., assignor, by mesne assignments, to U. S. Industrial Alcohol Co., New York, N. Y., a corporation of West Virginia Application June 6, 1941, Serial No. 396,822

4 Claims. (Cl. 183—115)

This invention relates to recovery of olefin oxides from gaseous mixtures, particularly such as are produced by the direct oxidation of olefins with air or oxygen.

In the direct oxidation of olefins such as ethylene, propylene and the like, the resulting gaseous mixture contains relatively small amounts, from 1% to 2% for example, of the olefin oxide, together with large proportions of inert or diluent gases such as oxygen, nitrogen, carbon dioxide and unoxidized olefins. The recovery of the olefin oxide from such a gaseous mixture presents numerous difficulties, and unless conducted in an efficient manner, the recovery may prove to be so costly as not to warrant practical and commercial operations.

Uses for olefin oxides are being developed, and the requirements for such oxides are increasing. Heretofore, much of the ethylene oxide produced has been converted into glycol because recovery in this form is simpler and less costly than recovery of the olefin oxide without conversion. It is desirable, therefore, to afford an inexpensive method whereby substantially all of the olefin oxide produced by direct oxidation of olefins can be separated without conversion to glycol and thus recovered at a minimum cost and utilized for the various purposes for which it may be adapted.

It is known that olefin oxides may be separated from gaseous mixtures by absorption in water, which is an effective solvent. Thereafter the olefin oxide can be separated from the water solution by treating the solution with steam. With the relatively dilute mixtures of the character hereinbefore indicated, it is necessary, if all of the olefin oxide is to be recovered, to use relatively large volumes of water. The treatment of such volumes of water with steam involves considerable expense. This expense may be reduced to some extent, if only a portion of the olefin oxide is separated from the gaseous mixture by absorption in water, because a considerable proportion of the olefin oxide can thus be recovered in much smaller volumes of water. This, however, entails a considerable loss of the olefin oxide, which more or less balances the saving due to the reduction in the amount of steam required to release the olefin oxide from the water. Consequently, there is no commercial advantage in proceeding in this manner.

It has been suggested that olefin oxides may be separated from gaseous mixtures containing them by selective adsorption in activated carbons from which the olefin oxide can be separated subsequently by subjecting the carbon to reaction with steam. This procedure is not, however, efficient when the concentration of the olefin oxide in the gaseous mixture exceeds approximately 1%. The forms of activated carbon available do not readily adsorb all of the olefin oxide if the concentration is higher than that indicated. Consequently, commercial operations based upon adsorption of ethylene oxide by activated carbon are not practicable where the gaseous mixture contains the proportions of the olefin oxide usually present in mixtures produced by oxidation of olefins.

It is the object of the present invention to afford a method of recovering olefin oxides from gaseous mixtures containing them in a commercially practicable and efficient manner.

A further object of the invention is the provision of a method in which a large proportion of the olefin oxides in a gaseous mixture may be separated initially by absorption in water, the remainder being recovered by the use of activated carbon so that losses of the olefin oxide are avoided and at the same time the procedure is conducted to minimize the cost of recovery.

Other objects and advantages of the invention will be apparent as it is better understood by reference to the following specification and the accompanying drawing, which illustrates diagrammatically apparatus capable of use in the application of the invention.

In carrying out the invention, the gaseous mixture, including relatively low proportions of the olefin oxide, is scrubbed in any suitable apparatus with water. From 75% to 80% of the olefin oxide present in the gaseous mixture can be dissolved readily in a relatively small volume of water which is maintained preferably near room temperature or somewhat higher if desired. A temperature of from 25° to 30° C. is satisfactory. No attempt is made to separate all of the olefin oxide from the gaseous mixture at this stage, the balance of the gaseous mixture being subsequently treated as hereinafter described to recover the remainder of the olefin oxide so that the inert gases may be discharged eventually substantially free from the olefin oxide.

After solution of the olefin oxide in water, the latter is subjected to the action of steam. If steam were simply introduced to the solution, a large part of it would be condensed and there would be an excessive heat requirement in raising the temperature of the water to that of the steam. This can be avoided, however, by introducing steam at a pressure so low that no appreciable condensation of the steam in contact with the absorbing liquor results. The temperature of the absorbing liquor is not altered appreciably by this operation, and the heat requirement becomes relatively insignificant. The olefin oxide mixed with the steam leaves the expelling chamber and is compressed to the atmospheric pressure. It may be conducted then through a suitable condenser and cooled to the required temperature to condense the steam, whereupon the olefin oxide can be removed and conveyed to suitable storage receptacles.

Meanwhile the balance of the gaseous mixture, now containing much smaller proportions of the olefin oxide, is conveyed to the adsorbing chamber containing a suitable activated carbon or active charcoal, of which numerous varieties are available as commercial products. Any of these activated carbons or active charcoals which are commonly used as adsorbents may be employed for the purpose of the invention. By passing the gaseous mixture preferably in a downward direction through the adsorbing material, the remaining olefin oxide is removed selectively from the gaseous mixture, although there may be some adsorption of small amounts of other gases present in the mixture. The residue of the gaseous mixture may be discharged to the atmosphere or utilized for any useful purpose. The adsorption is conducted preferably at about room temperature, that is to say in the neighborhood of 25° to 30° C.

When the adsorbent material has become sufficiently saturated with the olefin oxide, it is necessary to treat it to remove and recover the olefin oxide. This is accomplished by the introduction of steam which is directed preferably downwardly through the mass. The separation is readily accomplished, provided care is taken to avoid overheating of the carbon which tends to cause conversion of a portion of the olefin oxide into glycol. It is preferable, therefore, to use wet steam until the carbon bed is thoroughly moistened with water and thereafter to employ superheated steam. It may be desirable to embed coils in the mass of carbon through which heating or cooling media may be circulated as required to maintain proper temperature conditions within the bed.

The material leaving the bed consists of olefin oxide in the gaseous phase admixed with small proportions of other gases, together with condensed steam which may retain some of the olefin oxide in solution. To recover the olefin oxide, the material in the vapor phase may be passed through a column where substantially all of the olefin oxide can be washed out by means of a suitable solvent such as water at atmospheric pressure. The resulting solution can then be treated in a suitable still operating at any desired pressure to separate the ethylene oxide in a pure form. If desired, the residue from the washing column can be returned to the adsorbent to recover any traces of the olefin oxide which may have escaped the washing operation.

It is possible also to recover the olefin oxide from the gaseous mixture withdrawn from the absorbent by cooling it sufficiently so that the olefin oxide is liquefied and mixed with the condensed steam. By fractionating this mixture in a suitable column, the olefin oxide may be recovered readily.

After removing the olefin oxide from the adsorbent, it is necessary to dry the adsorbent thoroughly before again using it to adsorb the olefin oxide. Otherwise hydrolysis will occur and the formation of glycol will eventually render the adsorbent unsuitable for further use without expensive regeneration. Drying is best accomplished by passing a stream of air or other inert gas, heated to a suitable temperature, for example 110° to 250° C., through the moist adsorbent. The drying gas is preferably passed in a downward direction and for a sufficient period of time. Since the carbon is an excellent insulating material, drying is a difficult procedure, and it may be necessary to introduce steam into the coils previously mentioned to facilitate removal of moisture therefrom. It is then necessary to cool the carbon before it is again used, as an adsorbent, and the coils may be utilized again by introducing a suitable cooling medium thereto and in addition cold air or other inert gas may be directed downwardly through the carbon bed until the carbon is in suitable condition for further use as an adsorbent in the method.

From the foregoing, it will be understood that I employ in the operation two separate steps, first, absorption in water and then adsorption with activated carbon or active charcoal to recover effectively all of the olefin oxide present in the gaseous mixture. In the initial step, the major part of the olefin oxide is recovered as such without the necessity of employing excessive volumes of water or of steam to effect the separation. Substantially all of the balance of the olefin oxide is recovered by adsorption with the carbonaceous adsorbent. When the two steps are utilized in the manner indicated, the cost of recovering the olefin oxide is reduced to the minimum, and the cost is such as to warrant commercial use of the procedure.

The invention will be better understood by reference to the drawing, in which 5 indicates a tower containing packing material 6 adapted to provide contact between the liquid and gas entering the tower. The gaseous mixture containing the olefin oxide enters the tower 5 through a pipe 7 and passes upwardly in contact with water which enters the top of the tower through the pipe 8. A portion of the olefin oxide is absorbed, and the balance of the gaseous mixture escapes through a pipe 9. The water containing olefin oxide leaves the tower at the bottom through a pipe 10 and is delivered by a pump 11 to the top of the tower 12 which is likewise filled with packing material 13 adapted to ensure surface contact between the liquid and steam which is introduced through a pipe 14 at the bottom of the tower. Water from the bottom of the tower 12 is withdrawn through a pipe 15 and delivered by a pump 16 to the pipe 8 and thus returns to the tower 5.

The steam and olefin oxide are withdrawn through a pipe 17 by means of a pump 18 which maintains in the tower 12 a sub-atmospheric pressure so low that the temperature of the water in the tower is not substantially altered by the steam which is introduced thereto. The pressure may be from a fraction of 1 pound to 5 pounds absolute. At such pressures there is substantially no heat transfer from the steam to the water and consequently no loss of heat in raising the temperature of the water. The steam passes through the tower, effecting the release of the olefin oxide, and escapes thereafter through the pipe 17 and pump 18 which delivers the mixture to a condenser 19. Here the mixture is cooled by any suitable cooling medium such as water introduced through a pipe 20 and withdrawn through a pipe 21. The condensed steam and the olefin oxide pass through a pipe 22 into a trap 23 from which water resulting from the condensation of steam may be withdrawn from time to time as required through a syphon discharge pipe 24. The olefin oxide is withdrawn through a pipe 25 and may be delivered to any suitable storage receptacle.

The gaseous mixture containing the residue of the olefin oxide is delivered by the pipe 9 to a column 26 which is packed with a suitable activated carbon or active charcoal 27 as hereinbefore described. The gas travels downwardly through the column 26 in contact with the absorbent material and escapes through a pipe 28 and a connecting pipe 29, provided with a valve 30. The olefin oxide is adsorbed and remains in the column 26 until such time as treatment is required to remove it. Thereupon a valve 31 in the pipe 9 and the valve 30 are closed. The gaseous mixture may in the interim be directed to a duplicate apparatus designed to adsorb the olefin oxide from the gaseous mixture while the adsorbed material is recovered. Steam may be introduced to the adsorbent material through a pipe 32 having a valve 33. As previously indicated, a coil 34 may be embedded within the adsorbent material and supplied with heating or cooling agents through valved connections 35 and 36 to control the temperature of the adsorbent material. The steam and the adsorbed olefin oxide escape through the pipe 28 and are delivered by a pipe 37 having a valve 38 to a column 39 which may be filled with packing material 40 adapted to facilitate contact between the gas and water which is introduced through a pipe 41 at the top of the column. The residual gas may escape through a pipe 42 provided with a valve 43, or may be returned through a pipe 44 having a valve 45 to the pipe 7. The water carrying the absorbed olefin oxide is withdrawn through a pipe 46 having a valve 47 and may be treated as hereinbefore described to recover an olefin oxide which is then delivered to any suitable storage receptacle.

When the olefin oxide has been removed from the adsorbent material, heated air may be introduced through a pipe 48 provided with a valve 49 and delivered to the adsorbent material to remove moisture therefrom. Heat may be applied through the coil 34 at this point to facilitate drying, and thereafter cold air is introduced through the pipe 48 and a cooling medium may be delivered to the coil 34 so that the temperature of the adsorbed material is readily reduced to the point where it is suitable for re-use in the operation.

By operating according to the present method in which the water supplied to the tower 5 is sufficient for only 70% to 80% or less recovery of the olefin oxide in the gas, and using only that steam required for a correspondingly low recovery of the dissolved olefin oxide, the steam and power required per unit weight of ethylene oxide may be as little as one-tenth of that required to give an over-all recovery of 98% or more of the original olefin oxide content of the gas. This represents an important advantage and saving not only in the expenditure for steam and power but in the size and cost of the equipment required for the operation. In the further carrying out of the method, the olefin oxide unabsorbed in the first step is recovered by adsorption with the carbonaceous adsorbent material. This procedure is likewise efficient provided, as in the present method, the concentration of the olefin oxide in the gaseous mixture is less than about 1%. The second step is well adapted, therefore, to permit the economical recovery of that portion of the olefin oxide which is not absorbed in water in the initial step of the procedure. Consequently the efficiency of the procedure as described is markedly superior to an operation which attempts to recover all of the olefin oxide, either by absorption in water or by adsorption with a carbonaceous adsorbent.

While I have described the method as using water as the solvent in the initial step, aqueous solvents or non-aqueous solvents such as oils may be used. This is true likewise in the absorption of the olefin oxide after the latter is recovered from the carbonaceous adsorbent.

The method as described affords an excellent commercial and economical procedure for the recovery of olefin oxides from dilute gaseous mixtures. Substantially all possibilities of loss are eliminated, and high efficiency is obtained, the cost of operation being the minimum available for the handling of such dilute gaseous mixtures.

Various changes may be made in the procedure and particularly in the details of the apparatus described, without departing from the invention or sacrificing any of the advantages thereof.

I claim:

1. The method of recovering olefin oxides from gaseous mixtures containing them which comprises separating olefin oxide, as such, from such a gaseous mixture by passing the gaseous mixture into contact with a solvent for the olefin oxide under conditions such that appreciable hydration of the olefin oxide does not take place and a portion of the olefin oxide in the gaseous mixture is dissolved in the solvent, the quantity of solvent and the time of contact between the solvent and the gaseous mixture being such that an amount of the olefin oxide in the gaseous mixture contacted with the solvent of the order of 20% to 30% is not dissolved in the solvent, subjecting the solvent to the action of steam to remove the olefin oxide therefrom, and passing the effluent gaseous mixture containing the remainder of the olefin oxide into contact with an active carbonaceous adsorbent for the olefin oxide.

2. The method of recovering olefin oxides from gaseous mixtures containing them which comprises separating olefin oxide, as such, from such a gaseous mixture by passing the gaseous mixture into contact with a solvent for the olefin oxide under conditions such that appreciable hydration of the olefin oxide does not take place and a portion of the olefin oxide in the gaseous mixture is dissolved in the solvent, the quantity of solvent and the time of contact between the solvent and the gaseous mixture being such that an amount of the olefin oxide in the gaseous mixture contacted with the solvent of the order of 20% to 30% is not dissolved in the solvent, subjecting the solvent to the action of steam, at a pressure so low that there is no appreciable condensation of the steam, to remove the olefin oxide therefrom, and passing the effluent gaseous mixture containing the remainder of the olefin oxide into contact with an active carbonaceous adsorbent for the olefin oxide.

3. The method of recovering olefin oxides from gaseous mixtures containing them which comprises separating olefin oxide, as such, from such a gaseous mixture by passing the gaseous mixture into contact with an aqueous solvent for the olefin oxide under conditions such that appreciable hydration of the olefin oxide does not take place and a portion of the olefin oxide in the gaseous mixture is dissolved in the solvent, the quantity of solvent and the time of contact between the solvent and the gaseous mixture being such that an amount of the olefin oxide in the gaseous mixture contacted with the solvent of the order of 20% to 30% is not dissolved in the solvent, subjecting the solvent to the action of steam to remove the olefin oxide therefrom, and passing the effluent gaseous mixture containing the remainder of the olefin oxide into contact with an active carbonaceous adsorbent for the olefin oxide.

4. The method of recovering olefin oxides from gaseous mixtures containing them which comprises separating olefin oxide, as such, from such a gaseous mixture by passing the gaseous mixture into contact with an aqueous solvent for the olefin oxide under conditions such that appreciable hydration of the olefin oxide does not take place and a portion of the olefin oxide in the gaseous mixture is dissolved in the solvent, the quantity of solvent and the time of contact between the solvent and the gaseous mixture being such that an amount of the olefin oxide in the gaseous mixture contacted with the solvent of the order of 20% to 30% is not dissolved in the solvent, subjecting the solvent to the action of steam, at a pressure so low that there is no appreciable condensation of the steam, to remove the olefin oxide therefrom, and passing the effluent gaseous mixture containing the remainder of the olefin oxide into contact with an active carbonaceous adsorbent for the olefin oxide.

FREDERICK R. BALCAR.